(12) United States Patent
Issa

(10) Patent No.: US 8,787,336 B1
(45) Date of Patent: *Jul. 22, 2014

(54) SYSTEM AND METHOD FOR ESTABLISHING A LOCAL CHAT SESSION

(75) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/961,716

(22) Filed: Dec. 7, 2010

Related U.S. Application Data

(63) Continuation of application No. 11/318,703, filed on Dec. 27, 2005, now Pat. No. 7,859,560.

(51) Int. Cl.
*H04W 4/00* (2009.01)

(52) U.S. Cl.
USPC .......................................... 370/338; 455/420

(58) Field of Classification Search
USPC ............. 455/435.1, 412.1, 423, 456.3, 556.1, 455/558; 370/338
See application file for complete search history.

(56) References Cited

U.S. PATENT DOCUMENTS

| | | |
|---|---|---|
| 5,666,661 A | 9/1997 | Grube et al. |
| 5,995,500 A | 11/1999 | Ma et al. |
| 6,020,810 A | 2/2000 | Har-Even |
| 6,052,122 A | 4/2000 | Sutcliffe et al. |
| 6,415,146 B1 | 7/2002 | Capece |
| 6,542,749 B2 | 4/2003 | Tanaka et al. |
| 6,549,768 B1 | 4/2003 | Fraccaroli |
| 6,580,704 B1 | 6/2003 | Wellig et al. |
| 6,744,750 B1 | 6/2004 | Berger |
| 6,757,684 B2 | 6/2004 | Svendsen et al. |
| 6,819,919 B1 | 11/2004 | Tanaka |
| 7,447,656 B2 | 11/2008 | Parthasarathy |
| 7,580,867 B2 | 8/2009 | Nykamp |
| 7,793,321 B2 | 9/2010 | Simms et al. |

(Continued)

FOREIGN PATENT DOCUMENTS

| | | |
|---|---|---|
| WO | 0015847 A2 | 3/2000 |
| WO | 0175672 A1 | 10/2001 |
| WO | 2004080103 A1 | 9/2004 |

OTHER PUBLICATIONS

Unknown, "Ad hoc protocol list," Wikipedia, the free encyclopedia, accessed Dec. 12, 2005, http://www.en.wikipedia.org/wiki/Ad_hoc_protocol_list, 9 pages.

(Continued)

*Primary Examiner* — Maria El-Zoobi
(74) *Attorney, Agent, or Firm* — Withrow & Terranova, PLLC

(57) ABSTRACT

A system and method are provided for initiating and establishing a local chat session. In general, a first network device determines whether to initiate a local chat session with a second network device based either directly or indirectly on a profile for the second network device. The profile includes content information describing content stored by the second network device. In one embodiment, the first network device obtains an identifier of the second network device via a local wireless connection and requests the profile for the second network device from a central node maintaining a database storing profiles for a number of network devices including the first and second network devices. After receiving the profile for the second network device from the central node, the first network device determines whether to initiate the local chat session with the second network device based on the profile for the second network device.

20 Claims, 12 Drawing Sheets

(56) References Cited

U.S. PATENT DOCUMENTS

| | | | |
|---|---|---|---|
| 8,000,695 B2 * | 8/2011 | Florkey et al. | 455/420 |
| 8,032,648 B2 | 10/2011 | Bodlaender | |
| 8,719,341 B2 | 5/2014 | Issa et al. | |
| 2002/0090911 A1 | 7/2002 | Evans et al. | |
| 2003/0043070 A1 | 3/2003 | Soliman | |
| 2003/0045296 A1 | 3/2003 | Burr | |
| 2003/0126213 A1 | 7/2003 | Betzler | |
| 2003/0208621 A1 | 11/2003 | Bowman | |
| 2004/0002348 A1 | 1/2004 | Fraccaroli | |
| 2004/0009750 A1 | 1/2004 | Beros et al. | |
| 2004/0120298 A1 * | 6/2004 | Evans et al. | 370/338 |
| 2004/0185881 A1 | 9/2004 | Lee et al. | |
| 2004/0203363 A1 | 10/2004 | Carlton et al. | |
| 2005/0038876 A1 | 2/2005 | Chaudhuri | |
| 2005/0120380 A1 | 6/2005 | Wolfe | |
| 2005/0174975 A1 * | 8/2005 | Mgrdechian et al. | 370/338 |
| 2005/0227676 A1 | 10/2005 | De Vries | |
| 2006/0008256 A1 | 1/2006 | Khedouri et al. | |
| 2007/0032240 A1 | 2/2007 | Finnegan et al. | |

OTHER PUBLICATIONS

Unknown, "Mobile Ad-hoc Networks (manet) Charter," Internet Engineering Task Force, modified Mar. 24, 2006, accessed May 22, 2006, http://www.ietf.org/html.charters/manet-charter.html, 3 pages.

Non-Final Rejection mailed Nov. 17, 2009, for U.S. Appl. No. 11/318,703.

Final Rejection mailed Mar. 22, 2010, for U.S. Appl. No. 11/318,703.

Notice of Allowance mailed Aug. 20, 2010, for U.S. Appl. No. 11/318,703.

* cited by examiner

SYSTEM AND METHOD FOR ESTABLISHING A LOCAL CHAT SESSION

RELATED APPLICATIONS

The present application is a continuation of U.S. patent application Ser. No. 11/318,703, filed Dec. 27, 2005, entitled "SYSTEM AND METHOD FOR ESTABLISHING A LOCAL CHAT SESSION," which is hereby incorporated herein by reference in its entirety.

FIELD OF THE INVENTION

The present invention relates to establishing a local chat session between two devices and more particularly relates to determining whether to initiate the local chat session based on profiles associated with the two devices.

BACKGROUND OF THE INVENTION

Chat services such as Yahoo! Messenger, MSN Messenger, and the like are popular means by which users communicate via the Internet. However, for mobile devices such as mobile telephones and Personal Digital Assistants (PDAs), access to the Internet may be limited due to cost or non-existent. Thus, since many mobile devices have local wireless interfaces, such as a Bluetooth interface, it is desirable to establish local chat sessions between mobile devices using their local wireless interfaces. However, unlike traditional Internet-based chat services, a chat service operating via the local wireless interface of a mobile device may have access to only a limited number of other mobile devices due to the limited coverage area of the local wireless interface. Further, the user may have no knowledge of the users of the other mobile devices and may be unable to make an intelligent determination as to whether he or she should initiate a local chat session with a user of one of the other mobile devices. As such, there remains a need for a system and method of establishing a local chat session wherein an intelligent decision is made as to whether to initiate the local chat session either automatically by the device or through interaction with the user.

SUMMARY OF THE INVENTION

The present invention relates to a system and method of initiating and establishing a local chat session. A local chat session is a chat session established over a local wireless connection established according to a local wireless standard, such as the Bluetooth standard, the Zigbee standard, one of the IEEE 802.11 standards, or the like. In general, a first network device determines whether to initiate a local chat session with a second network device based either directly or indirectly on a profile for the second network device. The profile includes content information describing content stored by the second network device. In one embodiment, the first network device obtains an identifier of the second network device via a local wireless connection and requests the profile for the second network device from a central node maintaining a database storing profiles for a number of network devices including the first and second network devices via a network such as the Internet. After receiving the profile for the second network device from the central node, the first network device determines whether to initiate the local chat session with the second network device based on the profile for the second network device or compatibility information generated based on a comparison of a profile for the first network device and the profile for the second network device.

In a second embodiment, the first network device obtains an identifier of the second network device via a local wireless connection and requests compatibility information for the second network device from a central node maintaining a database storing profiles for a number of network devices including the first and second network devices. In response, the central node generates the compatibility information based on a comparison of a profile for the first network device and the profile for the second network device and provides the compatibility information to the first network device. After receiving the compatibility information from the central node, the first network device determines whether to initiate the local chat session with the second network device based on the compatibility information and optionally the profile for the second network device.

In a third embodiment, a central node maintains a database storing profiles for a number of network devices including the first and second network devices. The first network device queries the central node to identify a network device satisfying specified criteria. The central node then searches the profiles stored in the database to find a network device satisfying the specified criteria, and provides a response identifying the second network device as the network device satisfying the specified criteria. The response may also include the profile for the second network device. Based on the response, the first network device determines whether to initiate a local chat session with the second network device.

In a fourth embodiment, a central node maintains a database storing profiles for a number of network devices including the first and second network devices. The first network device queries the central node to identify a network device satisfying specified criteria. The central node then searches the profiles stored in the database to find a network device satisfying the specified criteria, thereby identifying the second network device as the network device satisfying the specified criteria. The central node then generates compatibility information based on a comparison of a profile for the first network device and a profile for the second network device and provides a response including an identifier of the second network device and the compatibility information to the first network device. Based on the response, the first network device determines whether to initiate a local chat session with the second network device.

In a fifth embodiment, a central node maintains a database storing profiles for a number of network devices including the first and second network devices. The first network device registers with the central node to receive automatic alerts when a network device satisfying specified criteria is available. The central node then periodically searches the profiles stored in the database to find a network device satisfying the specified criteria. When a network device satisfying the specified criteria is found, the central node provides an alert to the first network device wherein the network device satisfying the specified criteria is identified as the second network device. The alert may include a profile for the second network device. Based on the alert, the first network device determines whether to initiate a local chat session with the second network device.

In a sixth embodiment, a central node maintains a database storing profiles for a number of network devices including the first and second network devices. The first network device registers with the central node to receive automatic alerts when a network device satisfying specified criteria is available. The central node then periodically searches the profiles stored in the database to find a network device satisfying the specified criteria. When a network device satisfying the specified criteria is found, the central node generates compatibility information based on a comparison of a profile for the first network device and a profile for the network device satisfying the specified criteria and provides a response including an identifier of the network device satisfying the specified criteria and the compatibility information to the first network device. Based on the response, the first network device determines whether to initiate a local chat session with the network device satisfying the specified criteria.

In a seventh embodiment, the first network device obtains the profile for the second network device from the second network device via a local wireless connection. Thereafter, the first network device determines whether to initiate a local chat session with the second network device based on the profile for the second network device, compatibility information generated based on a comparison of a profile for the first network device and the profile for the second network device, or a combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for initiating and establishing a local chat session. A local chat session is a chat session established over a local wireless connection established according to a local wireless standard, such as the Bluetooth standard, the Zigbee standard, one of the IEEE 802.11 standards, or the like. In general, a first network device determines whether to initiate a local chat session with the second network device based either directly or indirectly on a profile for the second network device. The profile for the second network device includes content information describing content stored on the second network device. If the first network device decides to initiate a local chat session, the first network device sends a local chat session request to the second network device via a local wireless connection. Optionally, the second network device may decide whether to accept the local chat session request based on the compatibility information obtained by the first network device, a profile for the first network device, second compatibility information obtained by the second network device, or any combination thereof. If the second network device decides to accept the local chat session request, it sends an acceptance to the first network device via the local wireless connection. In response, the first network device establishes a local chat session between the first and second network devices using a local wireless connection.

Figure 1:
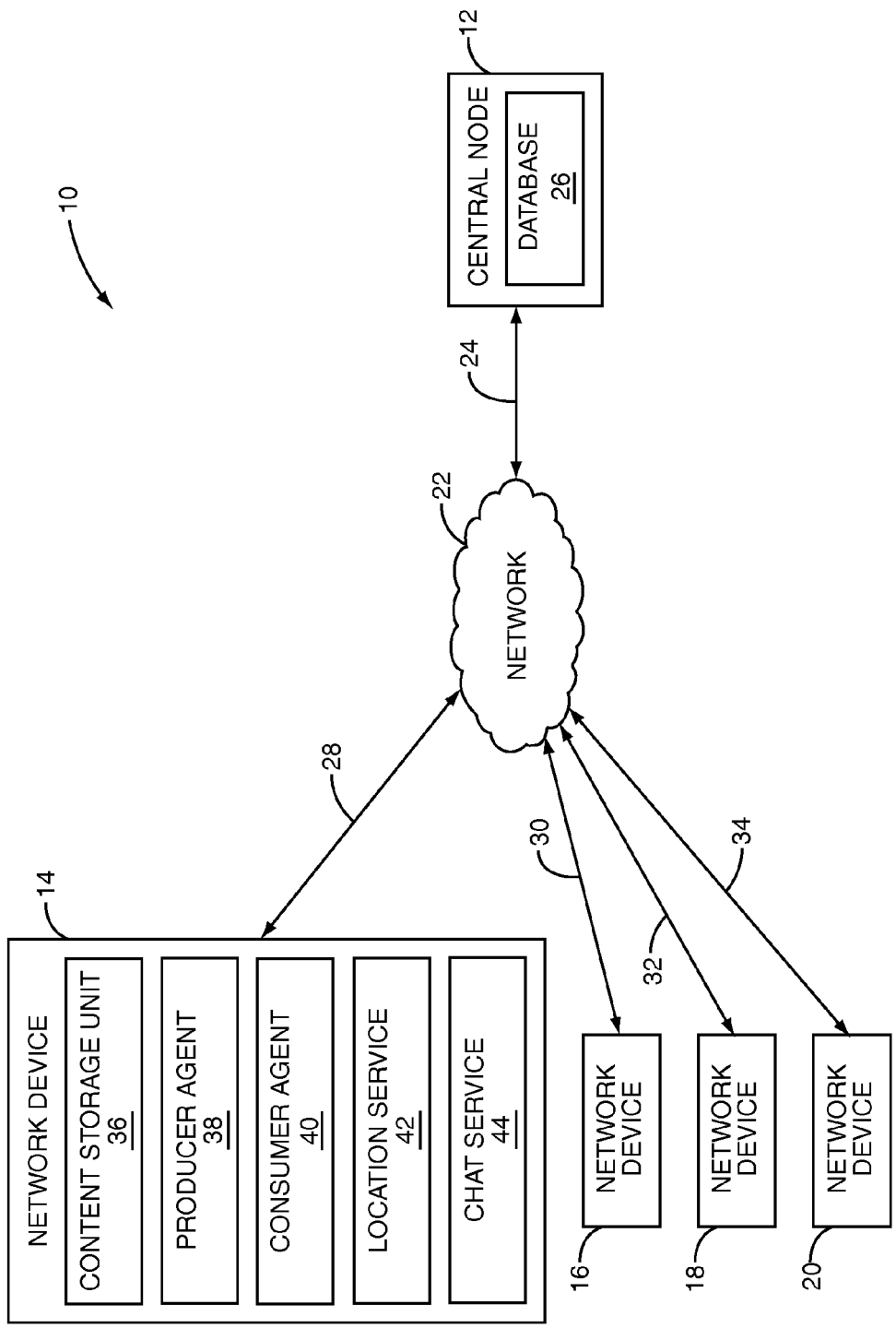
FIG. 1 illustrates a system wherein content information and optionally a location are obtained from a number of network devices and stored in a database at a central node according to one embodiment of the present invention.

In one embodiment, the present invention may be implemented using a communication system 10, such as that illustrated in FIG. 1. In general, the communication system 10 includes a central node 12 communicatively coupled to network devices 14-20 via a network 22. Preferably, the network 22 is the Internet. In essence, the central node 12 operates to obtain and store profiles for the network devices 14-20. Thereafter, the stored profiles may be used by the network devices 14-20 either directly or indirectly to establish local chat sessions. For example, when the network device 16 is within a local wireless coverage area of the network device 14, the network device 14 may directly or indirectly use the profile stored for the network device 16 to decide whether to initiate a local chat session with the network device 16.

The central node 12 is coupled to the network 22 by connection 24 and operates to maintain a database 26 storing profiles for the network devices 14-20. The connection 24 may be a wired connection or a wireless connection. The profiles for the network devices 14-20 include content information describing content stored by the network devices 14-20. In addition, the profiles may include a location of each of the network devices 14-20, preferences of users of the network devices 14-20, demographic information for the users of the network devices 14-20, and the like. Although the central node 12 is illustrated as a single network node, the central node 12 may be implemented as a number of servers each maintaining all or a portion of the database 26.

In operation, central node 12 obtains the profiles from the network devices 14-20. The central node 12 may request the profiles from the network devices 14-20 or receive the profiles from the network devices 14-20 automatically. In addition, the central node 12 may obtain periodic updates for the profiles of the network devices 14-20 either by request or automatically. For example, if the network devices 14-20 are mobile devices, the updates may include updated locations for the network devices 14-20. Optionally, the central node 12 may store historical information for each of the network devices 14-20. This may be particularly beneficial where the profiles include the locations of the network devices 14-20. For example, the historical information for each of the network devices 14-20 may include previous locations for the network devices 14-20.

The network devices 14-20 may be any mobile or stationary device and are connected to the network 22 via communication links 28-34. For example, the network devices 14-20 may be personal computers, Personal Digital Assistants (PDAs), mobile telephones, or the like. If the network devices 14-20 are mobile devices, the communication links 28-34 may be wireless communication links formed using a cellular communications standard, the Wireless Fidelity (Wi-Fi) standard, one of the IEEE 802.11 standards, or the like.

As illustrated, the network device 14 includes a content storage unit 36, a producer agent 38, consumer agent 40, optionally a location service 42, and a chat service 44. Note that the discussion herein of the network device 14 is equally applicable the network devices 16-20. The content storage unit 36 may be implemented in memory such as Random Access Memory (RAM) or in a storage device such as a hard disc drive and operates to store various types of content. The types of content stored in the content storage unit 36 depend on the operations performed by the network device 14. In general, the content stored by the content storage unit 36 may include digital assets such as, but not limited to, digital audio files, digital video files, digital images, playlists, bookmarked Uniform Resource Locators (URLs), dialed and received call lists including telephone numbers dialed and telephone numbers from which calls have been received, an address book, and the like. The address book may include information such as a name, mailing address, e-mail address, home page URL, telephone number, and the like for any number of contacts.

The producer agent 38 may be implemented in hardware, software, or a combination thereof and operates to provide the profile for the network device 14 to the central node 12. The central node 12 stores the profile in the database 26 in association with an identifier (ID) for the network device 14. The profile includes content information describing all or a portion of the content stored in the content storage unit 36. For digital images, the content information may include, but is not limited to, any number of tag values such as International Press Telecommunications Council (IPTC) and Exchangeable Image Format (EXIF) tag values. For example, the content information may include one or more keywords, a photo album name, a caption, a location of capture, a date and time of capture, a file name, and the like for each digital image. In a similar fashion, for each digital audio file, the content information may include, but is not limited to, a genre, artist name, album name, title, and file name. For each digital video file, the content information may include information such as, but not limited to, a genre, actor or actress names, title, and file name. The content information may also include playlists, information describing content currently being played by the network device 14, bookmarked URLs, received and dialed call lists, address books, and the like.

In addition, the profile may include the location of the network device 14 obtained from the location service 42, preferences of the user of the network device 14, demographic information for the user of the network device 14, and the like. The preferences of the user may include whether or not the user will permit a chat session to be established, desired profile information that may be used to identify one with whom the user desires to chat, and the like. For example, the preferences may include "Red Hot Chili Peppers," thereby indicating that the user is interested in chatting with other users associated with network devices storing songs by the Red Hot Chili Peppers even if the network device 14 does not store any songs by the Red Hot Chili Peppers. The demographic information may include the sex, age, mailing address, e-mail address, telephone number, and the like for the user of the network device 14. The producer agent 38 may provide the profile or an update to the profile to the central node 12 in response to a request from the central node 12. Alternatively, after initially sending the profile to the central node 12, the producer agent 38 may periodically send updates for the profile to the central node 12.

In one embodiment, the producer agent 38 may filter the content information according to predetermined configurations such that only desired content information is included in the profile provided to the central node 12. This may be beneficial for security purposes. More specifically, content may be stored in the content storage unit 36 that a user associated with the network device 14 desires to be kept private. As such, the user may configure the producer agent 38 such that the private information is filtered, or removed, from the content information included in the profile for the network device 14.

As discussed below, the producer agent 38 may also provide the ID of the network device 14 to the other network devices 16-20 via a local wireless communication interface when the network device 14 is proximate to the network devices 16-20. The network devices 16-20 are proximate to the network device 14 when the network devices 16-20 are within a range of a local wireless communication interface of the network device 14. The local wireless interface may operate to provide a local wireless connection according to a local wireless communication standard, such as, but not limited to, the Bluetooth standard, the Zigbee standard, one of the IEEE 802.11 standards, or the like. Preferably, the ID of the network device 14 is provided as part of a broadcast message including the ID of the network device 14 and a URL of the central node 12. This may be particularly beneficial where the database 26 is distributed among a number of central nodes each having a different URL. In one embodiment, the broadcast message may be implemented as an Extensible Markup Language (XML) message.

The consumer agent 40 may be implemented in hardware, software, or a combination thereof. As discussed below, the consumer agent 40 may: (1) obtain the IDs of ones of the network devices 16-20 proximate to the network device 14 and query the database 26 at the central node 12 to obtain the profiles, compatibility information, or both for the ones of the network devices 16-20 and determine whether to initiate a local chat session with one or more of the ones of the network devices 16-20 based on the profiles, compatibility information, or both; (2) query the database 26 at the central node 12 to obtain the ID, profiles, compatibility information, or any combination thereof for ones of the network devices 16-20 satisfying specified criteria and determine whether to initiate a local chat session with one or more of the ones of the network devices 16-20; and (3) receive automatic alerts from the central node 12 when ones of the network devices 16-20 satisfying specified criteria are available and determine whether to initiate a local chat session with one of the network devices based on the alert.

The network device 14 may optionally include a location service 42 for obtaining the location of the network device 14. The location service 42 may be a Satellite Positioning System (SPS) receiver such as a Global Positioning System (GPS) receiver or the like. Alternatively, if the network device 14 has access to a cellular network, the location service 42 may obtain the location of the network device 14 from the cellular network.

The network device 14 also includes a chat service 44 providing text or voice chat functionality. The chat service 44 is preferably implemented in software but may alternatively be implemented as a combination of hardware and software. As discussed below, once the network device 14 identifies one of the network devices 16-20 with which to establish a local chat session, the chat service 44 operates to establish and conduct the local chat session. In addition, the chat service 44 may establish and conduct a network-based chat session via the network 22 when desired.

Figure 2:
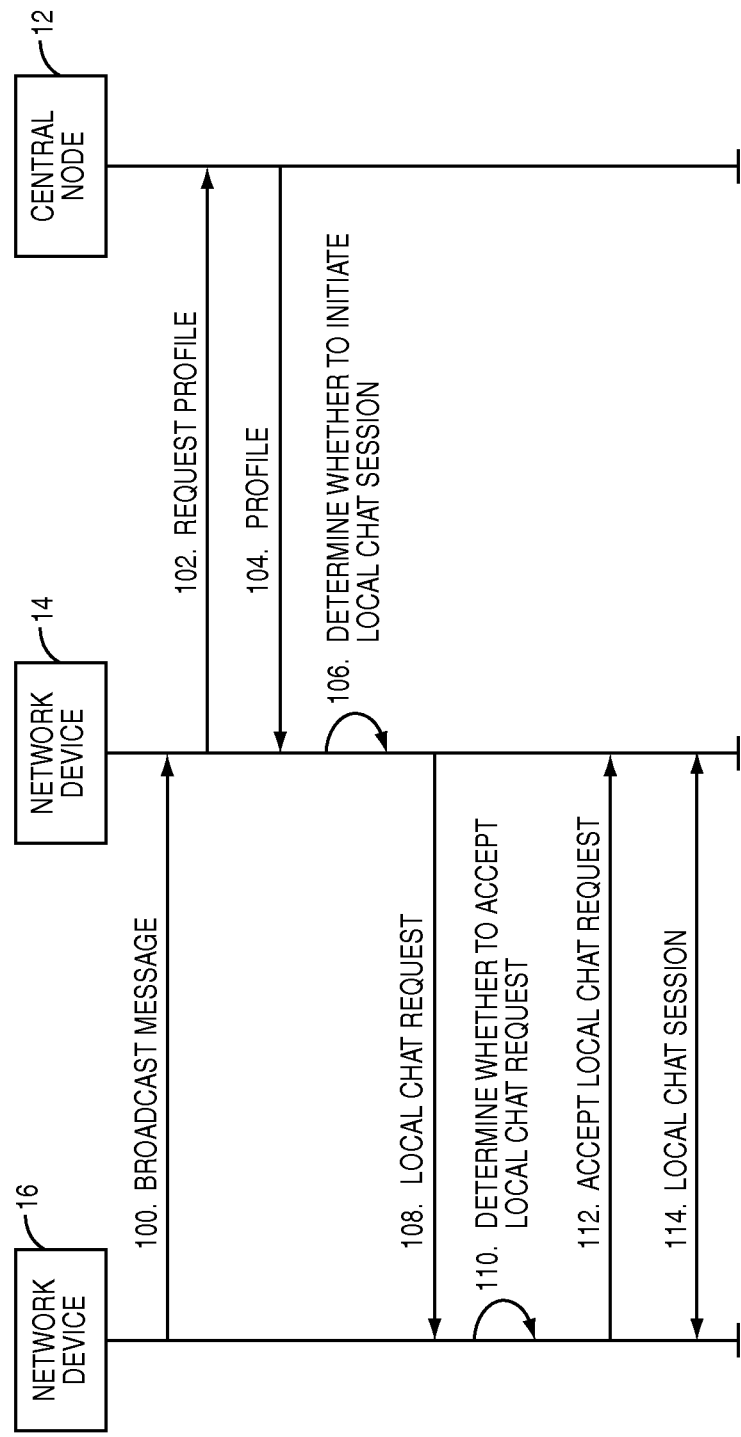
FIG. 2 illustrates a first exemplary process for establishing a local chat session between two network devices according to one embodiment of the present invention.

FIG. 2 illustrates a first exemplary process for establishing a local chat session between the network devices 14 and 16 according to one embodiment of the present invention. In general, the process begins when the network device 16 provides a broadcast message to the network device 14 via a local wireless connection (step 100). The broadcast message includes an ID of the network device 16 and optionally a URL of the central node 12. The broadcast message may be sent in response to a request from the network device 14 or automatically once the local wireless connection is established. As used herein, a "local wireless" connection is a wireless connection between the network devices 14 and 16 that is established according to a local wireless standard such as the Bluetooth standard, the Zigbee standard, one of the IEEE 802.11 standards, or the like.

After receiving the broadcast message, the network device 14 sends a request to the central node 12 via the network 22 for a profile, or a portion thereof, of the network device 16 (step 102). The request includes the ID of the network device 16. In response, the central node 12 uses the ID of the network device 16 to obtain the profile for the network device 16 from the database 26, and sends the profile, or a requested portion thereof, to the network device 14 (step 104).

Using the profile for the network device 16, the network device 14 determines whether to initiate a local chat session with the network device 16 (step 106). In one embodiment, the network device 14 communicates the profile for the network device 16 to the user of the network device 14, and the user selects whether to initiate a local chat session with the network device 16 based on the profile for the network device 16.

In another embodiment, the network device 16, and specifically the consumer agent 40, generates compatibility information providing an indication as to the compatibility of the users of the network devices 14 and 16 by comparing the profile for the network device 16 to the profile for the network device 14. More specifically, the network device 14 may generate the compatibility information based, at least in part, on a comparison of the content information and/or user preferences for the network device 16 to the content information and/or the user preferences for the network device 14. The compatibility information may be a compatibility score or any other indicia providing an indication of the compatibility of users of the network devices 14 and 16. Once the compatibility information is generated, the network device 14 may automatically determine whether to initiate a local chat session based on the compatibility information. For example, if the compatibility information is a compatibility score, the network device 14 may automatically determine to initiate a local chat session if the compatibility score is above a predetermined threshold. In another embodiment, the compatibility information may be communicated to the user of the network device 14, and the user decides whether to initiate a local chat session based on the compatibility information.

Assuming that the network device 14 determines to initiate a local chat session with the network device 16, the network device 14 then sends a local chat request to the network device 16 via a local wireless connection (step 108). In response, the network device 16 optionally determines whether to accept the local chat request (step 110). Alternatively, the network device 16 may simply accept the local chat request. The network device 16 may also be configured to reject all local chat requests. If so, the local chat request is automatically rejected.

If the local chat request is not automatically accepted or rejected, the network device 16 may determine whether to accept the local chat request based on the compatibility information generated by the network device 14, the profile for the network device 14, second compatibility information generated by the network device 16, or any combination thereof. For example, the network device 14 may provide the compatibility information generated by the network device 14 as part of the local chat request or in response to a request from the network device 16. The network device 16 may then automatically or through interaction with the user of the network device 16 determine whether to accept the local chat request based on the compatibility information. As a second example, the network device 14 may provide the ID of the network device 14 as part of the local chat request or in response to a request from the network device 16. The network device 16 may then obtain the profile for the network device 14 from the central node 12 using the ID of the network device 14 and automatically or through interaction with the user of the network device 16 determine whether to accept the local chat request based on the profile for the network device 14.

As a third example, the network device 14 may provide its profile as part of the local chat request or in response to a request from the network device 16. The network device 16 may then automatically or through interaction with the user of the network device 16 determine whether to accept the local chat request based on the profile for the network device 14.

As a fourth example, the network device 16 may obtain the profile for the network device 14 either from the central node 12 or directly from the network device 14 as described above. The network device 16 may then generate compatibility information based on a comparison of the profile for the network devices 14 and 16. More specifically, the network device 16 may generate the compatibility information based, at least in part, on a comparison of the content information and/or user preferences for the network device 14 to the content information and/or user preferences for the network device 16. The network device 16 may then automatically or through interaction with the user of the network device 16 determine whether to accept the local chat request based on the compatibility information generated by the network device 16.

As a last example, the network device 16 may obtain the profile for the network device 14 either from the central node 12 or directly from the network device 14 and generate compatibility information as described above. The network device 16 may then automatically or through interaction with the user of the network device 16 determine whether to accept the local chat request based on the compatibility information generated by the network device 16 and the profile for the network device 14. For example, if the compatibility information is a compatibility score, the network device 16 may automatically accept the local chat request if the compatibility score is above a predetermined threshold and the profile for the network device 14 satisfies a predetermined rule. As an example, the predetermined rule may be that the content information in the profile for the network device 14 must indicate that a particular song is stored on the network device 14 or that the user of the network device 14 has been in Wilmington, N.C. within the last six months.

Assuming that the network device 16 has determined to accept the local chat request, the network device 16 sends an acceptance to the network device 14 via a local wireless connection (step 112). In response, the network device 14 activates the chat service 44 to establish a local chat session with the network device 16 (step 114). Note that the local chat session is conducted over a local wireless connection rather than through the network 22.

Figure 3:
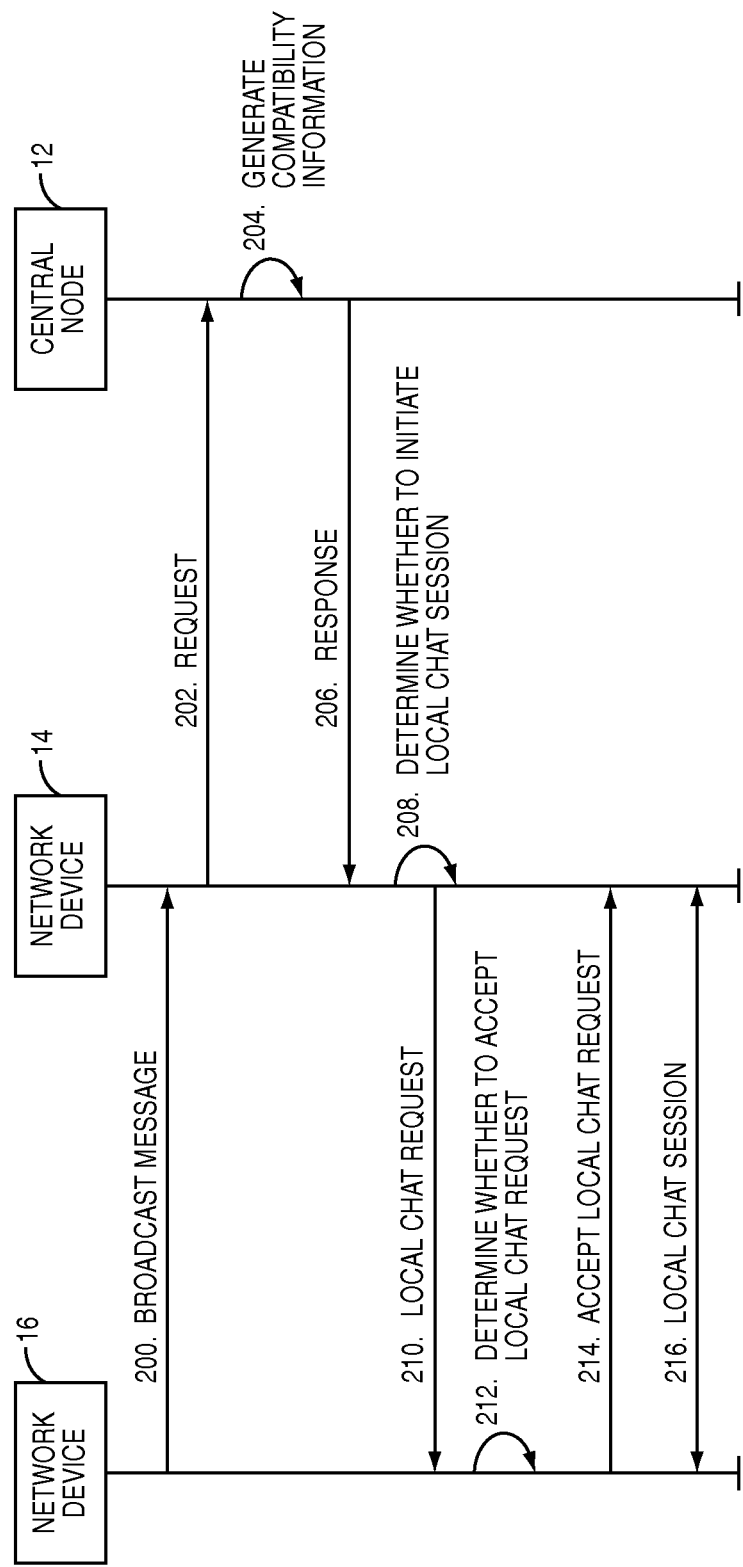
FIG. 3 illustrates a second exemplary process for establishing a local chat session between two network devices according to one embodiment of the present invention.

FIG. 3 illustrates a second exemplary process for establishing a local chat session according to one embodiment of the present invention. This process is substantially the same as the process in FIG. 2. However, in this embodiment, the central node 12 generates the compatibility information providing an indication as to whether the users of the network devices 14 and 16 are compatible. Again, the process begins when the network device 16 sends a broadcast message to the network device 14 via a local wireless connection (step 200). The broadcast message includes an ID of the network device 16 and optionally a URL of the central node 12.

After receiving the broadcast message, the network device 14 sends a request to the central node 12 via the network 22 for the compatibility information and optionally the profile, or a portion thereof, of the network device 16 (step 202). The request includes the IDs of the network devices 14 and 16. In response, the central node 12 uses the IDs of the network devices 14 and 16 to obtain the profiles of the network devices 14 and 16 from the database 26. Based on the profiles of the network devices 14 and 16, the central node 12 generates the compatibility information which provides an indication as to the compatibility of the users of the network devices 14 and 16 (step 204). More specifically, the central node 12 may generate the compatibility information based, at least in part, on a comparison of the content information and/or user preferences for the network device 14 and the content information and/or user preferences for the network device 16. The compatibility information may be a compatibility score or any other indicia providing an indication of the compatibility of users of the network devices 14 and 16.

After generating the compatibility information, the central node 12 sends the compatibility information and optionally the profile for the network device 16 to the network device 14 via the network 22 (step 206). Based on the compatibility information and optionally the profile for the network device 16, the network device 14 determines whether to initiate a local chat session with the network device 16 (step 208). In another embodiment, the network device 14 may automatically determine whether to initiate a local chat session based on the compatibility information. For example, if the compatibility information is a compatibility score, the network device 14 may automatically determine to initiate a local chat session if the compatibility score is above a predetermined threshold. In another embodiment, the compatibility information and optionally the profile for the network device 16 may be communicated to the user of the network device 14, and the user decides whether to initiate a local chat session based on the compatibility information and optionally the profile for the network device 16.

Assuming that the network device 14 determines to initiate a local chat session with the network device 16, the network device 14 then sends a local chat request to the network device 16 via a local wireless connection (step 210). In response, the network device 16 optionally determines whether to accept the local chat request (step 212). Alternatively, the network device 16 may simply accept the local chat request. Also, the network device 16 may be configured to reject all local chat requests. If so, the local chat request is automatically rejected.

If the local chat request is not automatically accepted or rejected, the network device 16 may determine whether to accept the local chat request based on the compatibility information generated by the central node 12, the profile for the network device 14, or both. For example, the network device 14 may provide the compatibility information generated by the central node 12 as part of the local chat request or in response to a request from the network device 16. The network device 16 may then automatically or through interaction with the user of the network device 16 determine whether to accept the local chat request based on the compatibility information. As a second example, the network device 14 may provide the compatibility information generated by the central node 12 and the ID of the network device 14 as part of the local chat request or in response to a request from the network device 16. The network device 16 may then obtain the profile for the network device 14 from the central node 12 using the ID of the network device 14 and automatically or through interaction with the user of the network device 16 determine whether to accept the local chat request based on the profile for the network device 14 and the compatibility information generated by the central node 12.

As a third example, the network device 14 may provide the compatibility information generated by the central node 12 and its profile as part of the local chat request or in response to a request from the network device 16. The network device 16 may then automatically or through interaction with the user of the network device 16 determine whether to accept the local chat request based on the profile for the network device 14 and the compatibility information generated by the central node 12.

Assuming that the network device 16 has determined to accept the local chat request, the network device 16 sends an acceptance to the network device 14 via a local wireless connection (step 214). In response, the network device 14 activates the chat service 44 to establish a local chat session with the network device 16 (step 216). Note that the local chat session is conducted over a local wireless connection rather than through the network 22.

Figure 4:
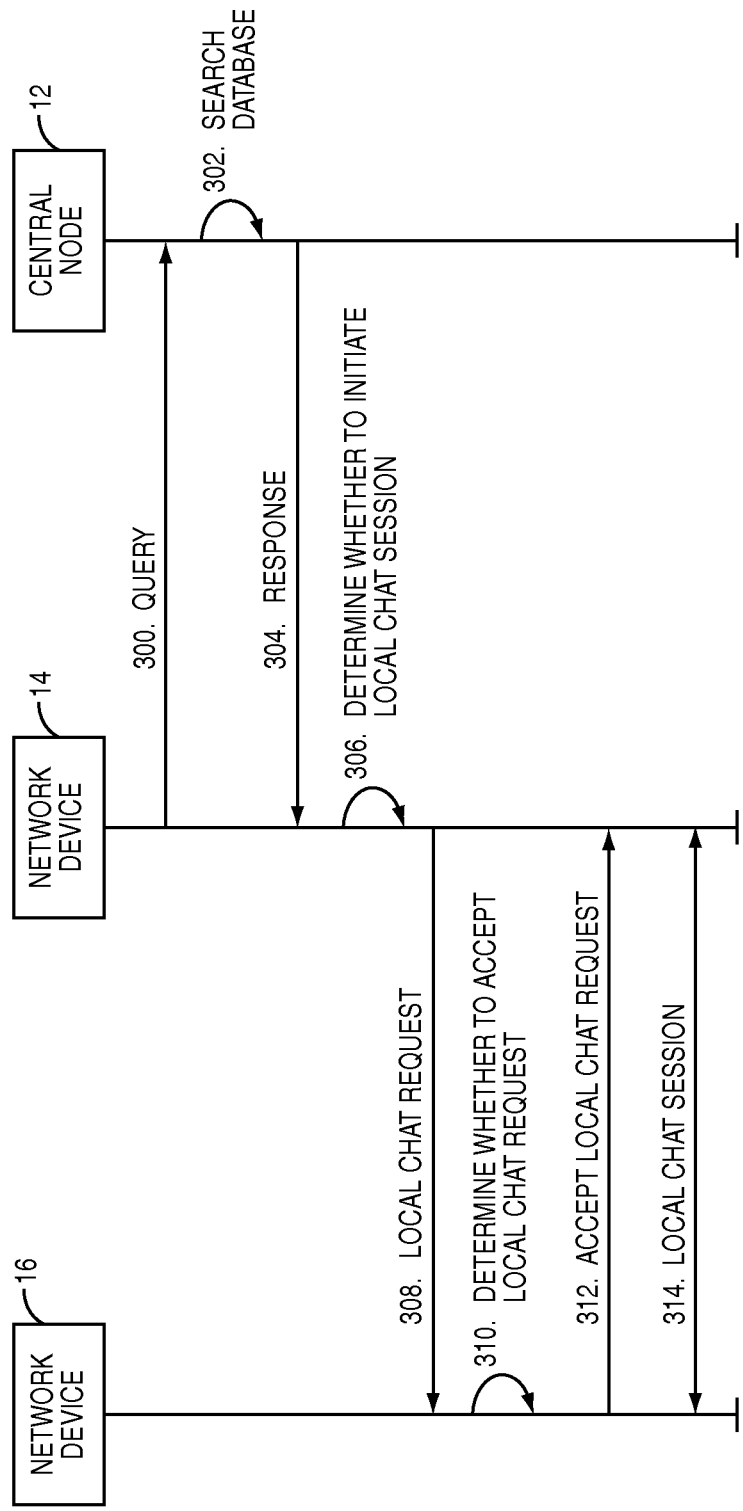
FIG. 4 illustrates a third exemplary process for establishing a local chat session between two network devices according to one embodiment of the present invention.

FIG. 4 illustrates a third exemplary process for establishing a local chat session. In this embodiment, the process begins when the network device 14 sends a query to the central node 12 to find one or more of the network devices 16-20 satisfying specified criteria (step 300). In one embodiment, the specified criteria includes a maximum distance from the network device 14. In addition, the specified criteria may include one or more desired values for content information fields, one or more user defined rules, or a combination thereof. Preferably, the maximum distance may approximately correspond to a coverage area of a local wireless interface of the network device 14. As an example, the specified criteria may include a maximum distance and a desired music artist. Further, if the maximum desired distance is 100 feet and the desired music artist is Barry Manilow, the central node 12 may search the database 26 to find ones of the network devices 16-20 located within 100 feet from the network device 14 that have one or more songs by Barry Manilow. As another example, the specified criteria may include a maximum distance and the rule "find network devices that have at least 50 images and have been in Wilmington, NC within the last 6 months." Using historical information stored for the network devices 14-20, the central node 12 may search for network devices satisfying this rule.

In another embodiment, the specified criteria includes an ID of a local area network whose coverage area the network device 14 is within. The local area network may be, for example, a Bluetooth piconet or scatternet or an IEEE 802.11 local area network. In addition, the specified criteria may include one or more desired values for content information fields, one or more user defined rules, or a combination thereof. In this case, the profile for each of the network devices 14-20 may additionally include IDs of one or more local area networks whose coverage area the network devices 14-20 are currently within.

In response to receiving the query, the central node 12 searches the database 26 to find one or more of the network devices 16-20 satisfying the specified criteria (step 302) and sends a response to the network device 14 identifying the ones of the network devices 16-20 satisfying the specified criteria (step 304). The response preferably includes the IDs and profiles of the ones of the network devices 16-20 satisfying the specified criteria. Based on the profiles of the ones of the network devices 16-20 satisfying the specified criteria, the network device 14 determines whether to initiate a local chat session (step 306).

In one embodiment, the network device 14 determines whether to initiate a local chat session automatically since the central node 12 has already determined that the network device 16 satisfies the specified criteria. The network device 14 may alternatively interact with the user of the network device 14 to determine if the user desires to initiate a local chat session. For example, the network device 14 may display the profile for the network device 16, or a portion thereof, to the user, and the user may then select whether to initiate a local chat session with the network device 16.

In another embodiment, the network device 16, and specifically the consumer agent 40, generates compatibility information for each one of the network devices 16-20 satisfying the specified criteria. The compatibility information provides an indication as to the compatibility of the user of the network device 14 and the users of the network devices 16-20 satisfying the specified criteria. The compatibility information may be generated by comparing the profiles of the network devices 16-20 satisfying the specified criteria to the profile for the network device 14. More specifically, the network device 14 may generate the compatibility information based, at least in part, on a comparison of the content information for the network devices 16-20 satisfying the specified criteria to the content information and/or the user preferences for the network device 14. For each of the network devices 16-20 satisfying the specified criteria, the compatibility information may be a compatibility score or any other indicia providing an indication of the compatibility of the users of the network devices 14 and 16.

Once the compatibility information is generated, the network device 14 may automatically determine whether to initiate a local chat session with one of the network devices 16-20 satisfying the specified criteria based on the compatibility information. For example, if the compatibility information is a compatibility score, the network device 14 may automatically determine to initiate a local chat session with one of the network devices 16-20 satisfying the specified criteria having a highest compatibility score. As another example, the compatibility information for the ones of the network devices 16-20 satisfying the specified criteria may be communicated to the user of the network device 14, and the user may select one of the network devices 16-20 satisfying the specified criteria with which to initiate a local chat session based on the compatibility information.

In this example, the network device 14 decides to initiate a local chat session with the network device 16. As such, the network device 14 sends a local chat request to the network device 16 via a local wireless connection (step 308). In response, the network device 16 optionally determines whether to accept the local chat request (step 310). Alternatively, the network device 16 may simply accept the local chat request. Also, the network device 16 may be configured to reject all local chat requests. If so, the local chat request is automatically rejected.

If the local chat request is not automatically accepted or rejected, the network device 16 may determine whether to accept the local chat request based on the compatibility information generated by the network device 14, the profile for the network device 14, second compatibility information generated by the network device 16, or any combination thereof as described above with respect to FIG. 1. Assuming that the network device 16 has determined to accept the local chat request, the network device 16 sends an acceptance to the network device 14 via a local wireless connection (step 312). In response, the network device 14 activates the chat service 44 to establish a local chat session with the network device 16 (step 314). Again, note that the local chat session is conducted over a local wireless connection rather than through the network 22.

Figure 5:
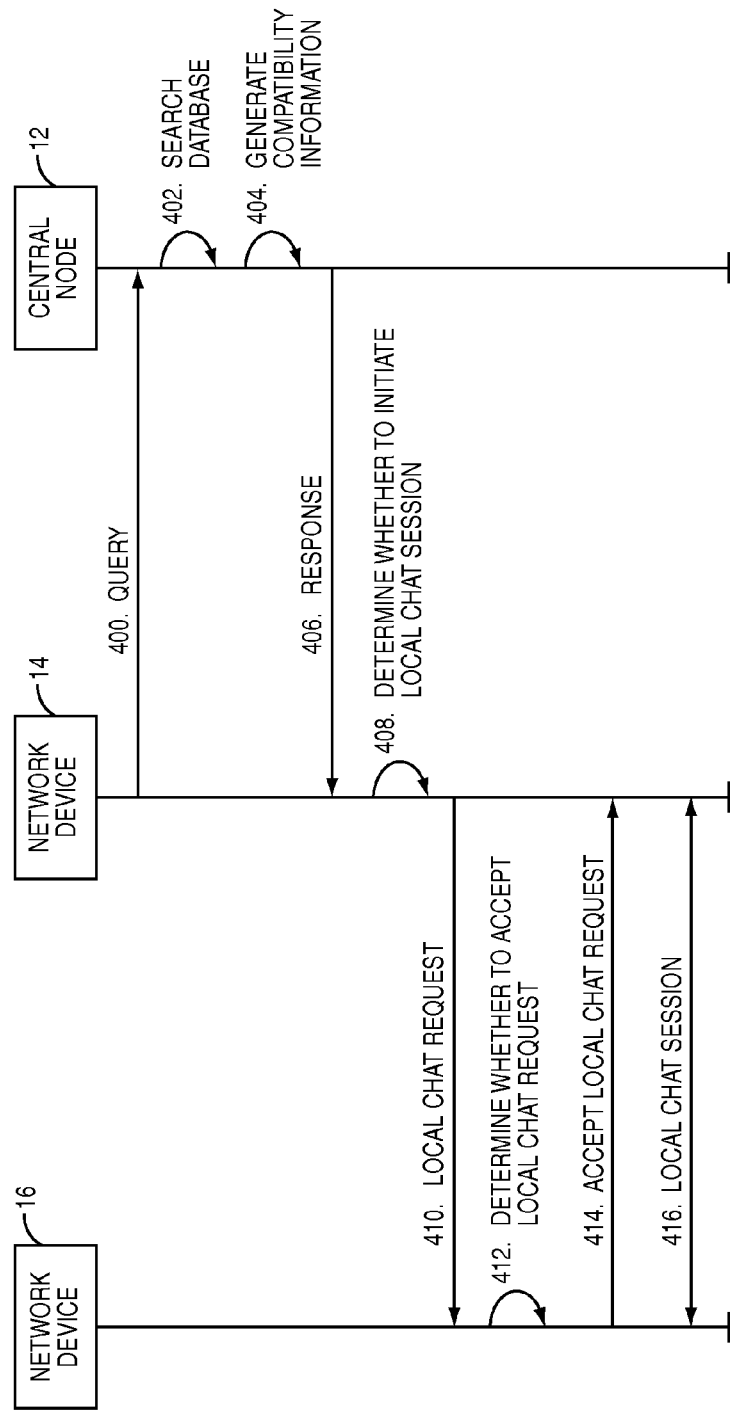
FIG. 5 illustrates a fourth exemplary process for establishing a local chat session between two network devices according to one embodiment of the present invention.

FIG. 5 illustrates a fourth exemplary process for establishing a local chat session according to one embodiment of the present invention. This process is substantially the same as the process in FIG. 4. However, in this embodiment, the central node 12, rather than the network device 14, generates the compatibility information. Again, the process begins when the network device 14 sends a query to the central node 12 to find ones of the network devices 16-20 satisfying specified criteria (step 400). In one embodiment, the specified criteria includes a maximum distance from the network device 14. In addition, the specified criteria may include one or more desired values for content information fields, one or more user defined rules, or a combination thereof. Preferably, the maximum distance may approximately correspond to a coverage area of a local wireless interface of the network device 14.

In another embodiment, the specified criteria includes an ID of a local area network whose coverage area the network device 14 is within. The local area network may be, for example, a Bluetooth piconet or scatternet or an IEEE 802.11 local area network. In addition, the specified criteria may include one or more desired values for content information fields, one or more user defined rules, or a combination thereof. In this case, the profile for each of the network devices 14-20 may additionally include IDs of one or more local area networks whose coverage area the network devices 14-20 are currently within.

In response to receiving the query, the central node 12 searches the database 26 to find ones of the network devices 16-20 satisfying the specified criteria (step 402). Thereafter, the central node 12 generates compatibility information for each of the ones of the network devices 16-20 satisfying the specified criteria (step 404). The compatibility information provides an indication as to the compatibility of the user of the network device 14 and the users of the ones of the network devices 16-20 satisfying the specified criteria. The compatibility information may be generated by comparing the profiles of the ones of the network devices 16-20 satisfying the specified criteria to the profile for the network device 14. More specifically, the central node 12 may generate the compatibility information based, at least in part, on a comparison of the content information and/or preferences for the ones of the network devices 16-20 satisfying the specified criteria to the content information and/or the user preferences for the network device 14. For each of the network devices 16-20 satisfying the specified criteria, the compatibility information may be a compatibility score or any other indicia providing an indication of the compatibility of users of the network devices 14 and 16.

Once the compatibility information is generated, the central node 12 sends a response to the network device 14 including the IDs, compatibility information, and optionally the profiles of the ones of the network devices 16-20 satisfying the specified criteria (step 406). Based on the compatibility information and optionally the profiles of the ones of the network devices 16-20 satisfying the specified criteria, the network device 14 determines whether to initiate a local chat session (step 408).

In one embodiment, the network device 14 may automatically determine whether to initiate a local chat session with one of the network devices 16-20 satisfying the specified criteria based on the compatibility information. For example, if the compatibility information is a compatibility score, the network device 14 may automatically determine to initiate a local chat session with one of the network devices 16-20 satisfying the specified criteria having a highest compatibility score. As another example, the compatibility information and optionally the profiles for the ones of the network devices 16-20 satisfying the specified criteria may be communicated to the user of the network device 14, and the user may select one of the network devices 16-20 satisfying the specified criteria with which to initiate a local chat session based on the compatibility information.

In this example, the network device 14 decides to initiate a local chat session with the network device 16. As such, the network device 14 sends a local chat request to the network device 16 via a local wireless connection (step 410). In response, the network device 16 optionally determines whether to accept the local chat request (step 412). Alternatively, the network device 16 may simply accept the local chat request. Also, the network device 16 may be configured to reject all local chat requests. If so, the local chat request is automatically rejected.

If the local chat request is not automatically accepted or rejected, the network device 16 may determine whether to accept the local chat request based on the compatibility information generated by the central node 12, the profile for the network device 14, second compatibility information generated by the network device 16, or any combination thereof as described above with respect to FIG. 1. Assuming that the network device 16 has determined to accept the local chat request, the network device 16 sends an acceptance to the network device 14 via a local wireless connection (step 414). In response, the network device 14 activates the chat service 44 to establish a local chat session with the network device 16 (step 416). Again, note that the local chat session is conducted over a local wireless connection rather than through the network 22.

Figure 6:
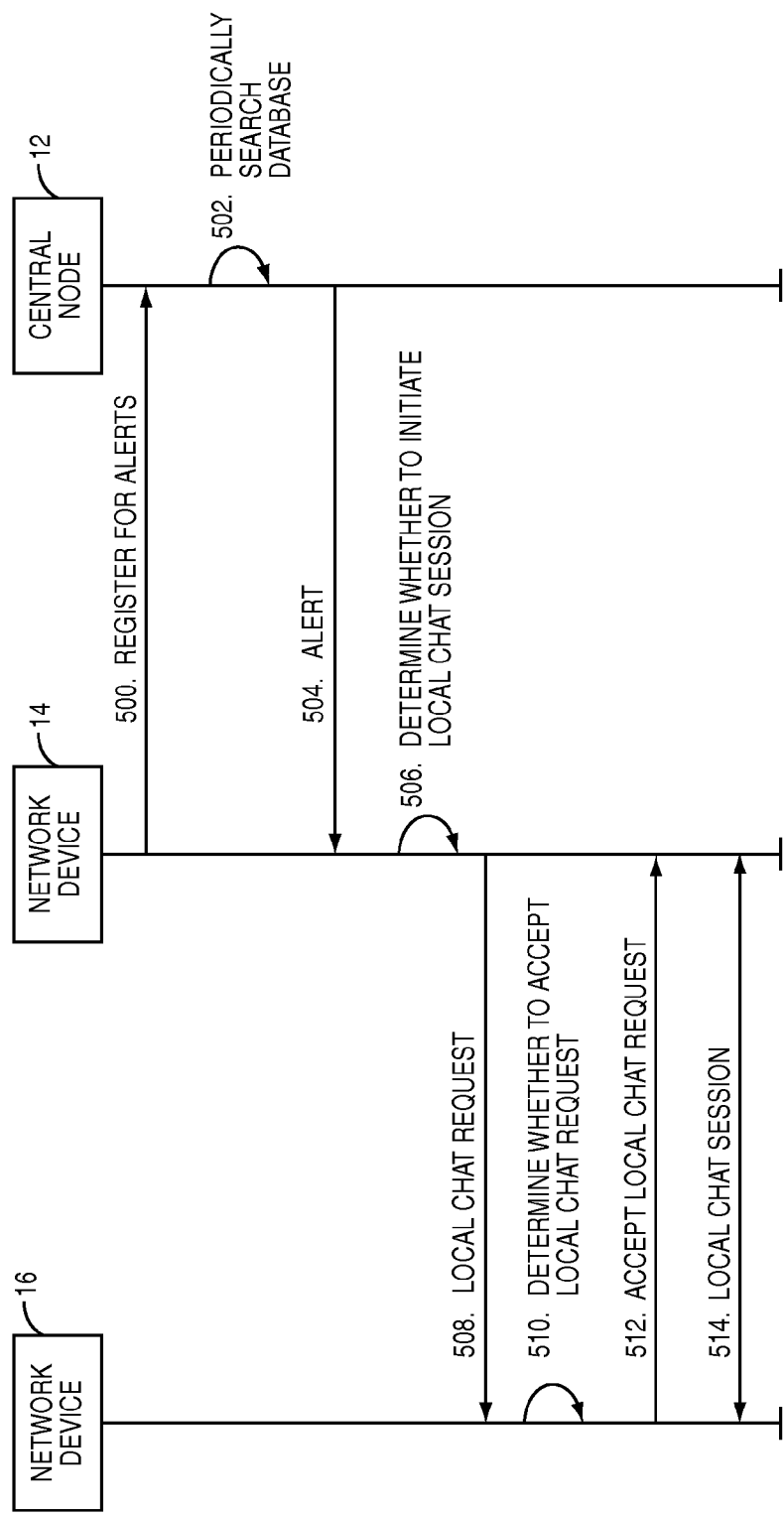
FIG. 6 illustrates a fifth exemplary process for establishing a local chat session between two network devices according to one embodiment of the present invention.

FIG. 6 illustrates a fifth exemplary process for establishing a local chat session according to one embodiment of the present invention. The process begins when the user of the network device 14 registers with the central node 12 to receive alerts when one or more of the network devices 16-20 satisfying specified criteria are available (step 500). In one embodiment, the specified criteria includes a maximum distance from the network device 14. In addition, the specified criteria may include one or more desired values for content information fields, one or more user defined rules, or a combination thereof. Preferably, the maximum distance may approximately correspond to a coverage area of a local wireless interface of the network device 14. In another embodiment, the specified criteria includes an ID of a local area network whose coverage area the network device 14 is within. The local area network may be, for example, a Bluetooth piconet or scatternet or an IEEE 802.11 local area network. In addition, the specified criteria may include one or more desired values for content information fields, one or more user defined rules, or a combination thereof. In this case, the profile for each of the network devices 14-20 may additionally include IDs of one or more local area networks whose coverage area the network devices 14-20 are currently within.

After the network device 14 has registered to receive alerts, the central node 12 periodically searches the database for ones of the network devices 16-20 satisfying the specified criteria (step 502). When the central node 12 identifies one of the network devices 16-20 satisfying the specified criteria, the central node 12 provides an alert to the network device 14 (step 504). The alert may include an ID and the profile for the identified network device. In this example, the identified network device is the network device 16.

Based on the alert, the network device 14 determines whether to initiate a local chat session (step 506). In one embodiment, the network device 14 may determine whether to initiate a local chat session automatically since the central node 12 has already determined that the network device 16 satisfies the specified criteria. In another embodiment, the network device 14 determines whether to initiate a local chat session with the network device 16 based on the profile for the network device 16 included within the alert. The network device 14 may alternatively interact with the user of the network device 14 to determine if the user desires to initiate a local chat session. For example, the network device 14 may display the profile for the network device 16, or a portion thereof, to the user, and the user may then select whether to initiate a local chat session with the network device 16.

In another embodiment, the network device 16, and specifically the consumer agent 40, generates compatibility information for the network device 16. The compatibility information provides an indication as to the compatibility of the user of the network device 14 and the user of the network device 16. The compatibility information may be generated by comparing the profile for the network device 16 to the profile for the network device 14. More specifically, the network device 14 may generate the compatibility information based, at least in part, on a comparison of the content information and/or user preferences for the network device 16 and the content information and/or user preferences for the network device 14. The compatibility information may be a compatibility score or any other indicia providing an indication of the compatibility of the users of the network devices 14 and 16.

Once the compatibility information is generated, the network device 14 may automatically determine whether to initiate a local chat session with the network device 16 based on the compatibility information. For example, if the compatibility information is a compatibility score, the network device 14 may automatically determine to initiate a local chat session with the network device 16 if the compatibility score is above a predetermined threshold. As another example, the compatibility information for the network device 16 may be communicated to the user of the network device 14, and the user decides whether to initiate a local chat session with the network device 16 based on the compatibility information.

In this example, the network device 14 decides to initiate a local chat session with the network device 16. As such, the network device 14 sends a local chat request to the network device 16 via a local wireless connection (step 508). In response, the network device 16 optionally determines whether to accept the local chat request (step 510). Alternatively, the network device 16 may simply accept the local chat request. Also, the network device 16 may be configured to reject all local chat requests. If so, the local chat request is automatically rejected.

If the local chat request is not automatically accepted or rejected, the network device 16 may determine whether to accept the local chat request based on the compatibility information generated by the network device 14, the profile for the network device 14, second compatibility information generated by the network device 16, or any combination thereof as described above with respect to FIG. 1. Assuming that the network device 16 has determined to accept the local chat request, the network device 16 sends an acceptance to the network device 14 via a local wireless connection (step 512). In response, the network device 14 activates the chat service 44 to establish a local chat session with the network device 16 (step 514). Again, note that the local chat session is conducted over a local wireless connection rather than through the network 22.

Figure 7:
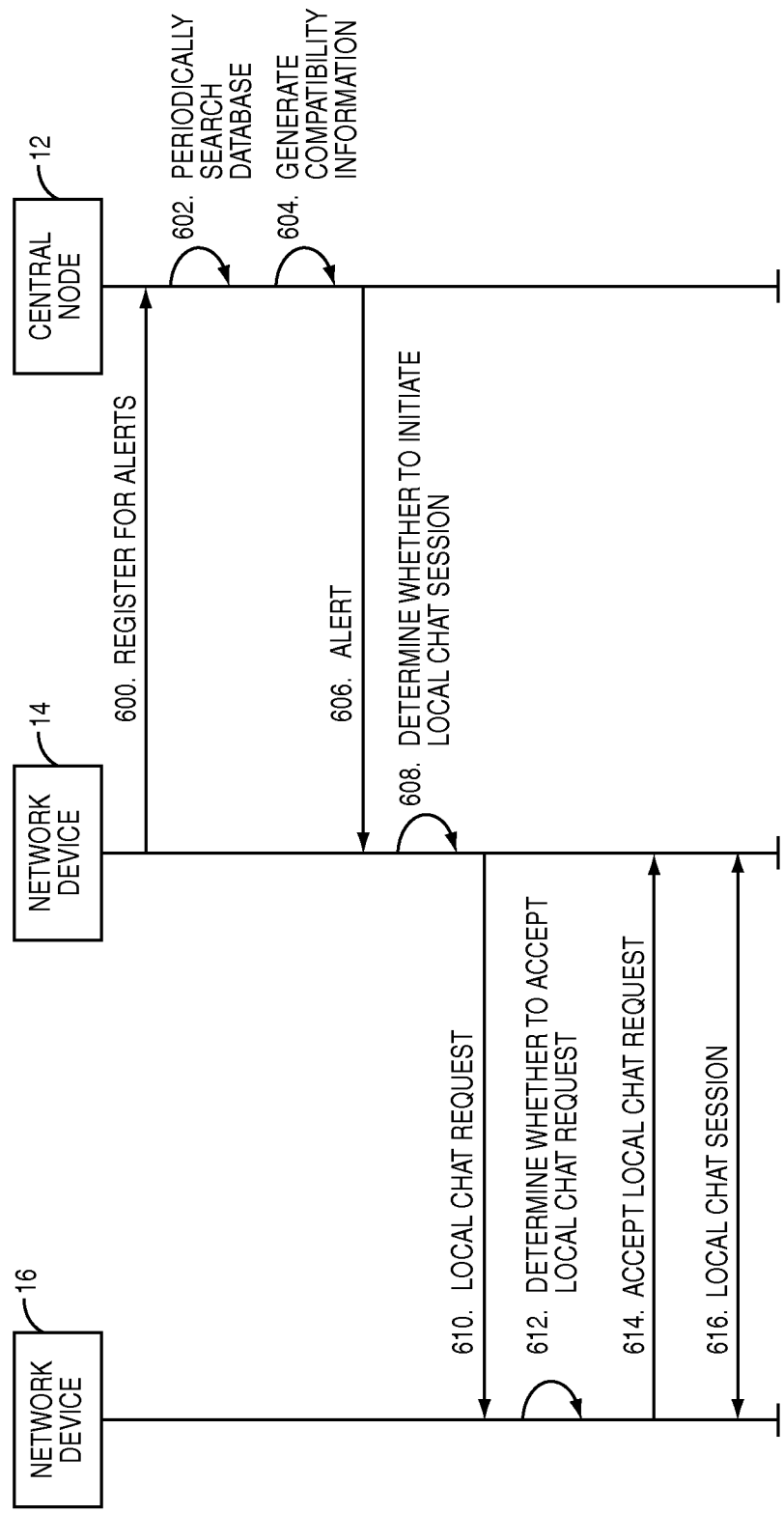
FIG. 7 illustrates a sixth exemplary process for establishing a local chat session between two network devices according to one embodiment of the present invention.

FIG. 7 illustrates a sixth exemplary process for establishing a local chat session according to one embodiment of the present invention. This process is substantially the same as the process in FIG. 6. However, in this embodiment, the central node 12, rather than the network device 14, generates the compatibility information. Again, the process begins when the user of the network device 14 registers with the central node 12 to receive alerts when one or more of the network devices 16-20 satisfying specified criteria are available (step 600). In one embodiment, the specified criteria includes a maximum distance from the network device 14. In addition, the specified criteria may include one or more desired values for content information fields, one or more user defined rules, or a combination thereof. Preferably, the maximum distance may approximately correspond to a coverage area of a local wireless interface of the network device 14. In another embodiment, the specified criteria includes an ID of a local area network whose coverage area the network device 14 is within. The local area network may be, for example, a Bluetooth piconet or scatternet or an IEEE 802.11 local area network. In addition, the specified criteria may include one or more desired values for content information fields, one or more user defined rules, or a combination thereof. In this case, the profile for each of the network devices 14-20 may additionally include IDs of one or more local area networks whose coverage area the network devices 14-20 are currently within.

After the network device 14 has registered to receive alerts, the central node 12 periodically searches the database for ones of the network devices 16-20 satisfying the specified criteria (step 602). When the central node 12 identifies one of the network devices 16-20 satisfying the specified criteria, the central node 12 generates compatibility information for the identified network device (step 604). In this example, the identified network device is the network device 16. The compatibility information provides an indication as to the compatibility of the user of the network device 14 and the user of the network device 16. The compatibility information may be generated by comparing the profile for the network device 16 to the profile for the network device 14. More specifically, the central node 12 may generate the compatibility information based, at least in part, on a comparison of the content information and/or user preferences for the network device 16 and the content information and/or user preferences for the network device 14. The compatibility information may be a compatibility score or any other indicia providing an indication of the compatibility of users of the network devices 14 and 16.

Once the compatibility information is generated, the central node 12 provides an alert to the network device 14 (step 606). The alert may include an ID of the network device 16 and the compatibility information. In addition, the alert may include the profile for the identified network device.

Based on the compatibility information and optionally the profile for the network device 16, the network device 14 determines whether to initiate a local chat session with the network device 16 (step 608). In one embodiment, the network device 14 may automatically determine whether to initiate a local chat session with the network device 16 based on the compatibility information. For example, if the compatibility information is a compatibility score, the network device 14 may automatically determine to initiate a local chat session with the network device 16 if the compatibility score is above a predetermined threshold. In another embodiment, the compatibility information for the network device 16 may be communicated to the user of the network device 14, and the user decides whether to initiate a local chat session with the network device 16 based on the compatibility information.

In this example, the network device 14 decides to initiate a local chat session with the network device 16. As such, the network device 14 sends a local chat request to the network device 16 via a local wireless connection (step 610). In response, the network device 16 optionally determines whether to accept the local chat request (step 612). Alternatively, the network device 16 may simply accept the local chat request. Also, the network device 16 may be configured to reject all local chat requests. If so, the local chat request is automatically rejected.

If the local chat request is not automatically accepted or rejected, the network device 16 may determine whether to accept the local chat request based on the compatibility information generated by the central node 12, the profile for the network device 14, second compatibility information generated by the network device 16, or any combination thereof as described above with respect to FIG. 1. Assuming that the network device 16 has determined to accept the local chat request, the network device 16 sends an acceptance to the network device 14 via a local wireless connection (step 614). In response, the network device 14 activates the chat service 44 to establish a local chat session with the network device 16 (step 616). Again, note that the local chat session is conducted over a local wireless connection rather than through the network 22.

Figure 8:
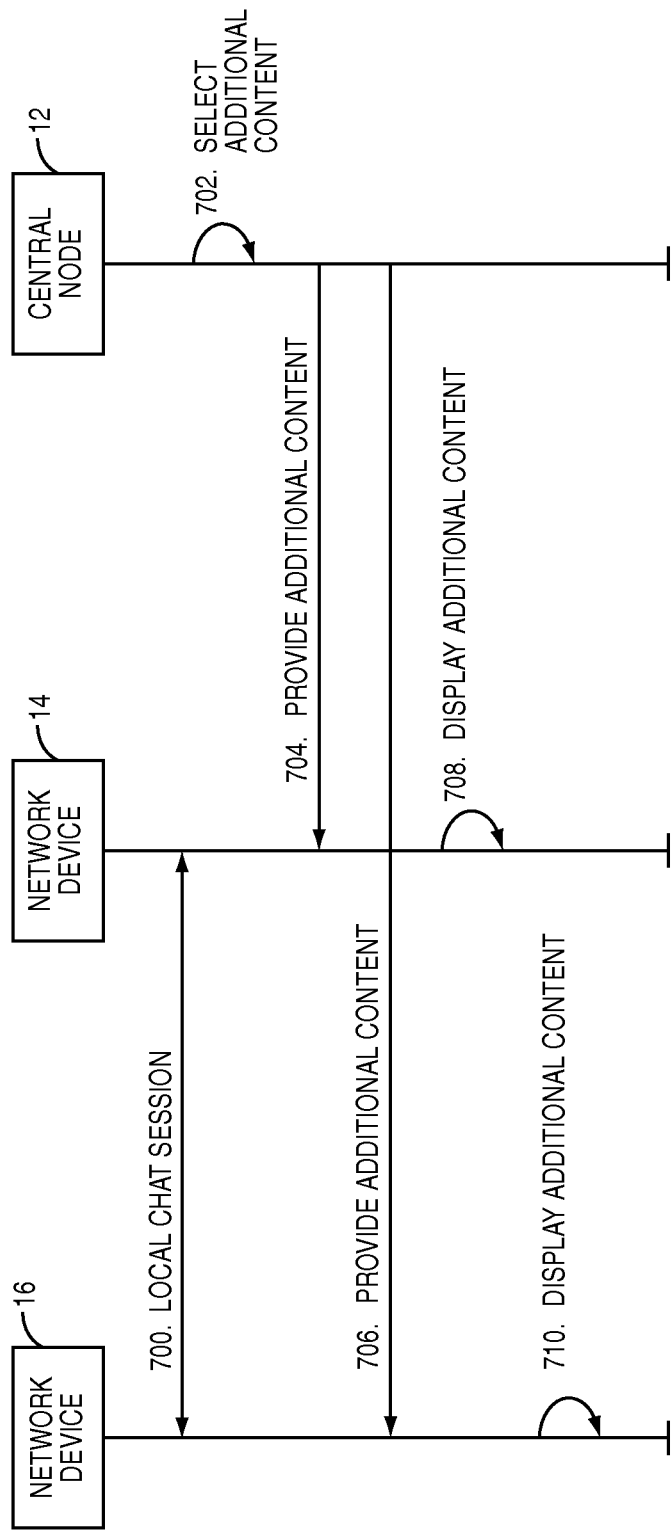
FIG. 8 illustrates an exemplary process for providing additional content, such as advertisements, to network devices during a local chat session according to one embodiment of the present invention.

FIG. 8 illustrates an exemplary process for providing additional content, such as advertisements, to the network devices 14 and 16 during a local chat session. In general, a local chat session is established according to any of the processes described above (step 700). During the local chat session, the central node 12 selects additional content to provide to the network devices 14 and 16 (step 702). The central node 12 may select different additional content for each of the network devices 14 and 16, or may select the same additional content for each of the network devices 14 and 16. In one embodiment, the central node 12 may select the additional content based on the profiles of the network devices 14 and 16. For example, the central node 12 may select an advertisement based on the locations of the network devices 14 and 16. In another embodiment, if the central node 12 generates compatibility information for the network devices 14 and 16, the central node 12 knows the portions of the profiles for the network devices 14 and 16 that indicate that they are compatible. For example, the central node 12 may know that the content information stored in the profiles for the network devices 14 and 16 indicates that both of the network devices 14 and 16 have songs by Barry Manilow, and that such is a key reason the network devices 14 and 16 are compatible. As such, the central node 12 may select additional information, such as advertisements, relating to Barry Manilow shows or concerts.

After selecting the additional content, the central node 12 provides the additional content to the network devices 14 and 16 (steps 704 and 706), and the network devices 14 and 16 display the additional content to the users of the network devices 14 and 16 (steps 708 and 710). The additional content may be stored at the central node 12 and provided from the central node 12 to the network devices 14 and 16. Alternatively, the additional content may reside on a remote network node. In this case, the central node 12 may store information describing the additional content stored on the remote node, select the additional content to provide to the network devices 14 and 16 based on the information describing the additional content residing on the remote node and the profiles of the network devices 14 and 16, retrieve the selected additional content from the remote node, and provide the additional content to the network devices 14 and 16. Alternatively, the central node 12 may direct the remote node to provide the selected additional content to the network devices 14 and 16.

Figure 9:
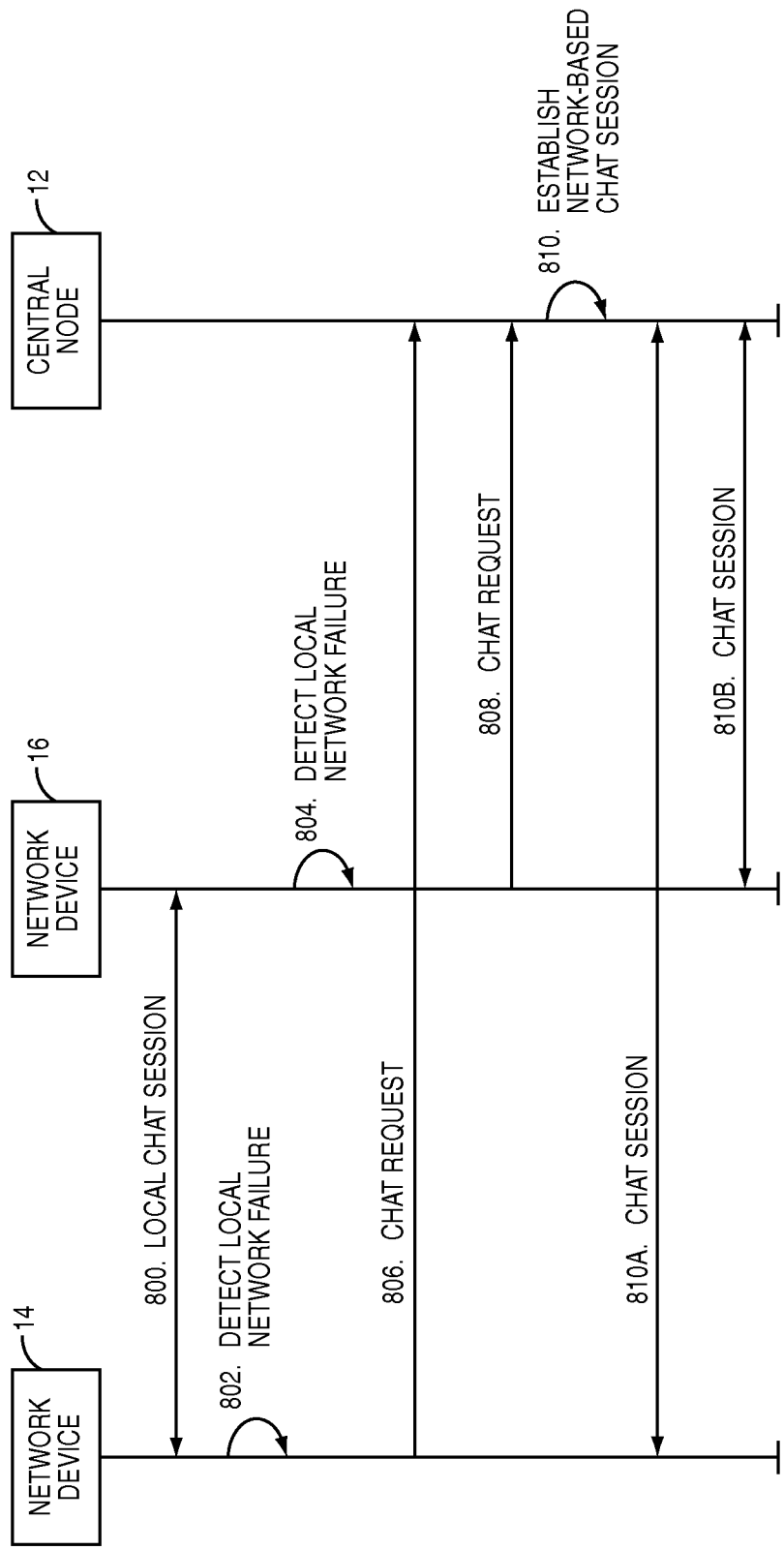
FIG. 9 illustrates an exemplary process wherein the central node of FIG. 1 provides automatic reconnection for a chat session when a local wireless connection between two network devices fails during a local chat session according to one embodiment of the present invention.

FIG. 9 illustrates an exemplary process wherein the central node 12 provides automatic reconnection for the chat session when the local wireless connection between the network devices 14 and 16 fails for any reason. In general, a local chat session is established according to any of the processes described above (step 800). When there is a failure of the local wireless connection between the network devices 14 and 16, the network devices 14 and 16 detect the failure of the local wireless connection (steps 802 and 804). There may be a failure of the local wireless connection when, for example, the network device 16 is no longer within the range of the local wireless interface of the network device 14. In response, the network devices 14 and 16 send a chat request, or notification of the failure, to the central node 12 (steps 806 and 808). Based on the requests, the central node 12 operates to establish a network-based chat session between the network devices 14 and 16 over the network 22 via the central node 12 (step 810). At that point, the chat session continues between the network devices 14 and 16 via the central node 12 (steps 810A and 810B). Preferably, steps 802-810B are transparent to the users of the network devices 14 and 16 such that the chat session is not interrupted. However, the network devices 14 and 16 may display a message or in some other manner notify the users of the network devices 14 and 16 that they are now chatting over the network 22. This may be particularly beneficial where the users must pay for their access to the network 22.

Figure 10:
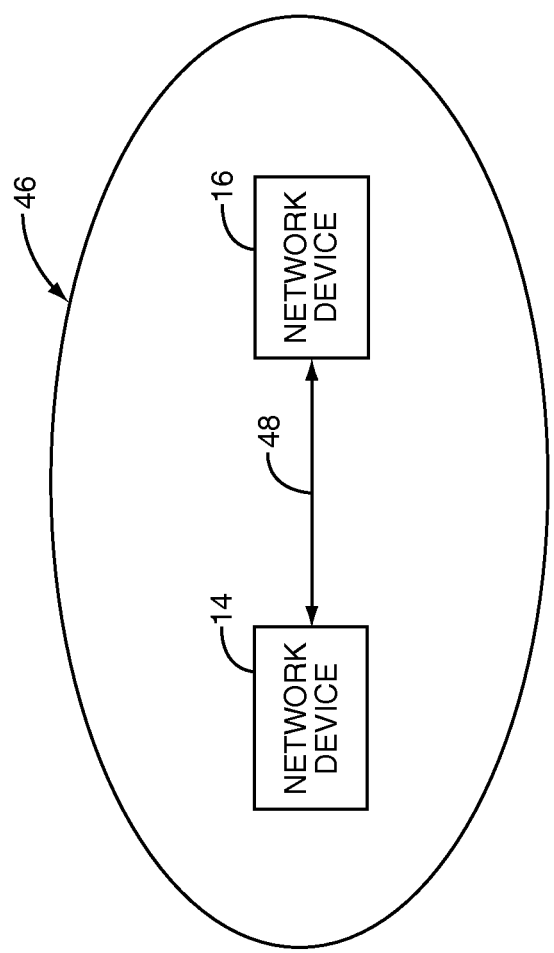
FIG. 10 illustrates a second embodiment of the present invention wherein a local chat session is established between two network devices without interaction with the central node of FIG. 1.

FIG. 10 illustrates a second embodiment of the present invention wherein a local chat session is established between the network devices 14 and 16 without interaction with the central node 12 (FIG. 1). In this embodiment, when the network device 16 enters a local wireless coverage area 46 of the network device 14, a local wireless connection 48 is established. Thereafter, the network devices 14 and 16 determine whether to establish a local chat session. If a local chat session is desired, a local chat session is established over the local wireless connection 48.

Figure 11:
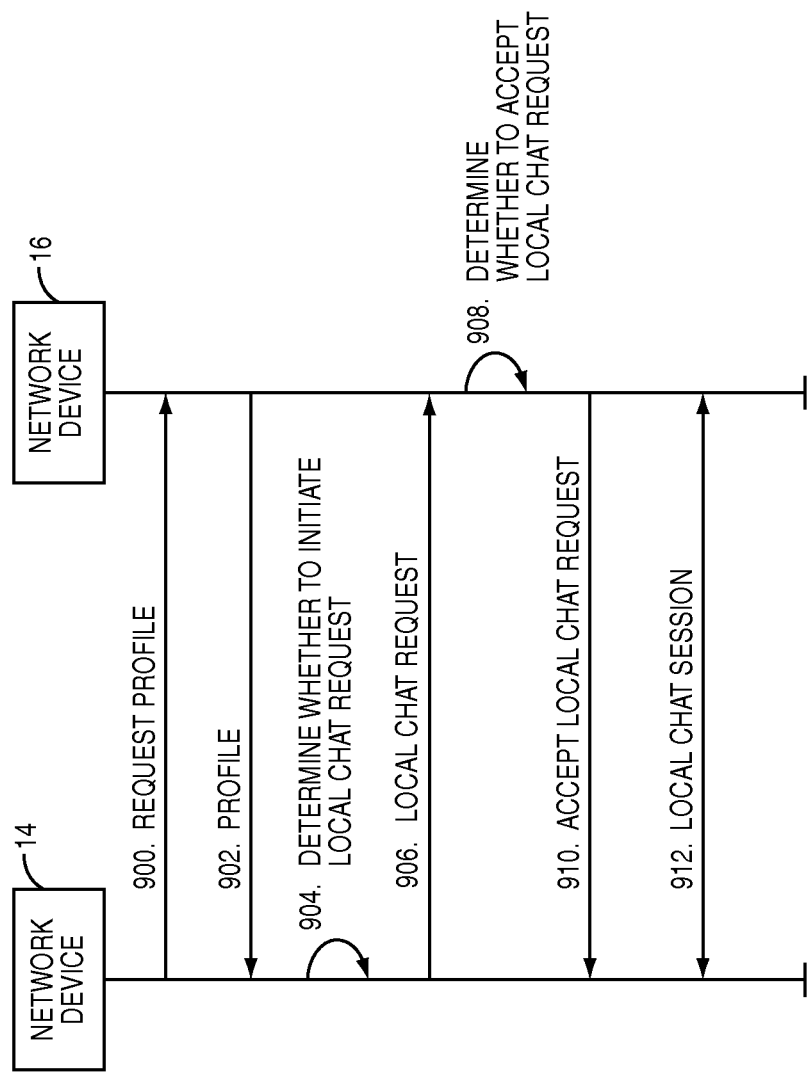
FIG. 11 illustrates an exemplary process for establishing a local chat session between the network devices of FIG. 10 according to one embodiment of the present invention.

FIG. 11 illustrates an exemplary process for establishing a local chat session between the network devices 14 and 16 of FIG. 10. In general, the process begins when the network device 14 sends a request to the network device 16 via the local wireless connection 48 for the profile, or a portion thereof, for the network device 16 (step 900). The request from the network device 14 may be sent by the network device 14 upon detecting the network device 16 within the local wireless coverage area 46 and establishing the local wireless connection 48. After receiving the request, the network device 16 sends its profile, or a portion thereof, to the network device 14 (step 902). Note that in this embodiment, the profile for the network device 16 is obtained directly from the network device 16 rather than from the central server 12 (FIG. 1).

Using the profile for the network device 16, the network device 14 determines whether to initiate a local chat session with the network device 16 (step 904). In one embodiment, the network device 14 communicates the profile for the network device 14 to the user of the network device 14, and the user of the network device 14 selects whether to initiate a local chat session with the network device 16 based on the profile for the network device 16. In another embodiment, the network device 14, and specifically the consumer agent 40, generates compatibility information providing an indication as to the compatibility of the users of the network devices 14 and 16 by comparing the profile for the network device 16 to the profile for the network device 14. More specifically, the network device 14 may generate the compatibility information based, at least in part, on a comparison of the content information and/or preferences for the network device 16 to the content information and/or the user preferences for the network device 14. The compatibility information may be a compatibility score or any other indicia providing an indication of the compatibility of users of the network devices 14 and 16. Once the compatibility information is generated, the network device 14 may automatically determine whether to initiate a local chat session based on the compatibility information.

Assuming that the network device 14 determines to initiate a local chat session with the network device 16, the network device 14 then sends a local chat request to the network device 16 via the local wireless connection 48 (step 906). In response, the network device 16 optionally determines whether to accept the local chat request (step 908). Alternatively, the network device 16 may simply accept the local chat request. The network device 16 may also be configured to reject all local chat requests. If so, the local chat request is automatically rejected.

If the local chat request is not automatically accepted or rejected, the network device 16 may determine whether to accept the local chat request based on the compatibility information generated by the network device 14, the profile for the network device 14, second compatibility information generated by the network device 16, or any combination thereof, as described above. Assuming that the network device 16 has determined to accept the local chat request, the network device 16 sends an acceptance to the network device 14 via the local wireless connection 48 (step 910). In response, the network device 14 activates the chat service 44 to establish a local chat session with the network device 16 via the local wireless connection 48 (step 912).

Figure 12:
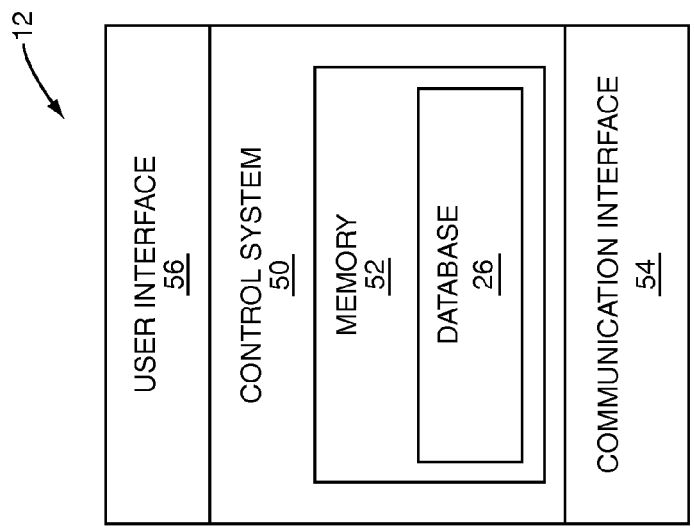
FIG. 12 is a block diagram of an exemplary embodiment of the central node of FIG. 1.

FIG. 12 is a block diagram of an exemplary embodiment of the central node 12. In general, the central node 12 includes a control system 50 having associated memory 52. In this example, the database 26 is implemented in the memory 52. However, the database 26 may be implemented in a separate storage unit such as a hard disc drive. The central node 12 also includes a communication interface 54 communicatively coupling the central node 12 to the network 22. The central node 12 may also include a user interface 56 including components such as a display, keyboard, and the like.

Figure 13:
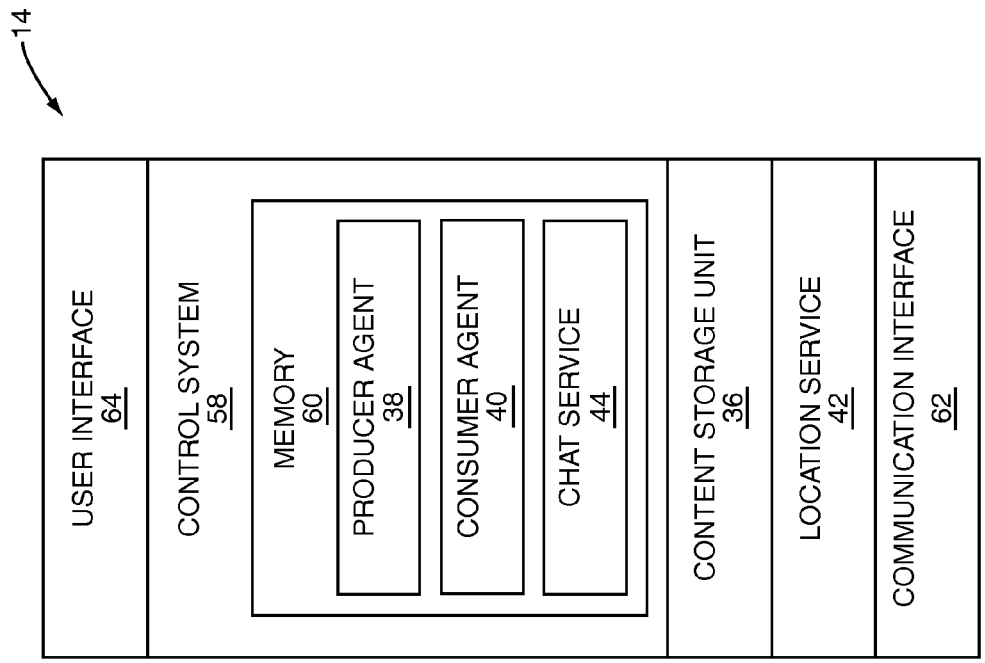
FIG. 13 is a block diagram of an exemplary embodiment of the network devices of FIGS. 1 and 10.

FIG. 13 is a block diagram of an exemplary embodiment of the network device 14. Note that this discussion equally applies to the network devices 16-20. In general, the network device 14 includes a control system 58 and associated memory 60. In this example, the producer agent 38, the consumer agent 40, and the chat service 44 are implemented in software and stored in the memory 60. Alternatively, the producer agent 38, the consumer agent 40, and the chat service 44 may be implemented in hardware or a combination of hardware and software. The network device 14 also includes the content storage unit 36. The content storage unit 36 may be implemented as memory, such as RAM, or as a storage device, such as a hard disc drive. Alternatively, the content storage unit 36 may be implemented in the memory 60.

The network device 14 optionally includes the location service 42. The location service 42 may be implemented in hardware, software, or a combination thereof. In one embodiment, the location service 42 is an SPS receiver. In another embodiment, the location service 42 communicates with a cellular network or the like to obtain the location of the network device 14.

The network device 14 also includes a communication interface 62. The communication interface 62 includes a local wireless communication interface operating according to the Bluetooth standard, the Zigbee standard, one of the IEEE 802.11 standards, or the like for communicating with the other network devices 16-20 when they are proximate to the network device 14. The communication interface 62 may also include an interface to the network 22. The interface to the network 22 may be wired or wireless. If wireless, the interface to the network 22 may operate according to a cellular communication standard, the Wi-Fi standard, or the like. The network device 14 also includes a user interface 64 including components such as a display, a keyboard or buttons, speakers, and the like.

As will be apparent to one of ordinary skill in the art, the network device 14 may include additional hardware, software, or a combination thereof. For example, if the network device 14 is a mobile telephone or PDA, the network device 14 may include additional hardware, software, or a combination thereof enabling the network device 14 to operate as a mobile telephone or PDA.

Those skilled in the art will recognize improvements and modifications to the preferred embodiments of the present invention. All such improvements and modifications are considered within the scope of the concepts disclosed herein and the claims that follow.

What is claimed is:

1. A computer-implemented method for providing content to a device engaged in a local chat session, comprising:
 receiving, by a central node comprising a processor, first content information describing one or more digital files stored on a first network device;
 receiving, by the central node, second content information describing one or more digital files stored on a second network device;
 determining, by the central node, that a local chat session has been established between the first network device and the second network device,
 based on both the first content information and the second content information, obtaining first additional content that is stored at the central node; and
 sending the first additional content to the first network device for display to a first user during the local chat session.

2. The computer-implemented method of claim 1, wherein the first additional content comprises advertising content.

3. The computer-implemented method of claim 2, wherein the first additional content is based on the first content information, the second content information, and a location of the first network device.

4. The computer-implemented method of claim 2, further comprising determining compatibility information based on the first content information and the second content information, and wherein the advertising content is based on the compatibility information.

5. The computer-implemented method of claim 1, wherein the first content information describes files stored on the first network device, and the second content information describes files stored on the second network device.

6. The computer-implemented method of claim 1, wherein determining, by the central node, that the local chat session has been established between the first network device and the second network device further comprises receiving notification of establishment of the local chat session from one of the first network device and the second network device.

7. The computer-implemented method of claim 1, wherein determining, by the central node, that the local chat session has been established between the first network device and the second network device further comprises establishing, by the central node, the local chat session between the first network device and the second network device.

8. The computer-implemented method of claim 1, further comprising sending the first additional content to the second network device for display to a second user during the local chat session.

9. The computer-implemented method of claim 1, further comprising;
 based on both the first content information and the second content information, obtaining second additional content that is different from the first additional content; and
 sending the second additional content to the second network device for display to a second user during the local chat session.

10. A computer server, comprising:
 a communication interface adapted to communicate with a network; and
 a control system comprising a processor, and adapted to:
 receive first content information describing one or more digital files stored on a first network device;
 receive second content information describing one or more digital files stored on a second network device;
 determine that a local chat session has been established between the first network device and the second network device,
 based on both the first content information and the second content information, obtain first additional content that is stored at the control system; and
 send the first additional content to the first network device for display to a first user during the local chat session.

11. The computer server of claim 10, wherein the first additional content comprises advertising content.

12. The computer server of claim 11, wherein the first additional content is based on the first content information, the second content information, and a location of the first network device.

13. The computer server of claim 11, wherein the control system is further adapted to determine compatibility information based on the first content information and the second content information, and wherein the advertising content is based on the compatibility information.

14. The computer server of claim 10, wherein the first content information describes files stored on the first network device, and the second content information describes files stored on the second network device.

15. The computer server of claim 10, wherein to determine that the local chat session has been established between the first network device and the second network device, the control system is further adapted to receive notification of establishment of the local chat session from one of the first network device and the second network device.

16. The computer server of claim 10, wherein to determine that the local chat session has been established between the first network device and the second network device, the control system is further adapted to establish the local chat session between the first network device and the second network device.

17. The computer server of claim 10, wherein the control system is further adapted to send the first additional content to the second network device for display to a second user during the local chat session.

18. The computer server of claim 10, wherein the control system is further adapted to:
- based on both the first content information and the second content information, obtain second additional content that is different from the first additional content; and
- send the second additional content to the second network device for display to a second user during the local chat session.

19. A computer-implemented method for providing content to a device engaged in a local chat session, comprising:
- receiving, by a central node comprising a processor, first content information describing one or more digital files stored on a first network device;
- receiving, by the central node, second content information describing one or more digital files stored on a second network device;
- determining, by the central node, that a local chat session has been established between the first network device and the second network device,
- based on both the first content information and the second content information, obtaining first additional content from a third network device; and
- sending the first additional content to the first network device for display to a first user during the local chat session.

20. The computer-implemented method of claim 19, wherein the third network device is a remote network node.

* * * * *